United States Patent
Li et al.

(10) Patent No.: US 11,842,143 B1
(45) Date of Patent: Dec. 12, 2023

(54) TECHNIQUES FOR THUMBNAIL AND PREVIEW GENERATION BASED ON DOCUMENT CONTENT

(71) Applicant: INTERNATIONAL BUSINESS MACHINES CORPORATION, Armonk, NY (US)

(72) Inventors: Dong Rui Li, Beijing (CN); Zai Ming Lao, Jian Cai Cheng West RD (CN); Ye Chen, Beijing (CN); Xue Lan Zhang, Beijing (CN); Xue Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/823,104

(22) Filed: Aug. 30, 2022

(51) Int. Cl.
G06F 40/166 (2020.01)
G06F 16/34 (2019.01)
G06F 40/106 (2020.01)
G06F 16/45 (2019.01)

(52) U.S. Cl.
CPC .......... *G06F 40/166* (2020.01); *G06F 16/345* (2019.01); *G06F 40/106* (2020.01); *G06F 16/45* (2019.01)

(58) Field of Classification Search
CPC ..... G06F 40/166; G06F 16/345; G06F 40/106
See application file for complete search history.

(56) References Cited

U.S. PATENT DOCUMENTS

| | | | |
|---|---|---|---|
| 6,810,404 B1* | 10/2004 | Ferguson | G06F 16/93 707/999.005 |
| 8,819,001 B1* | 8/2014 | Zhang | G06F 16/3346 707/723 |
| 8,937,737 B2 | 1/2015 | Tsutsumi | |
| 10,867,119 B1* | 12/2020 | Karppanen | G06F 40/20 |
| 11,593,555 B1* | 2/2023 | Anthony | G06F 40/205 |
| 11,594,310 B1* | 2/2023 | Bradley | G06N 20/00 |

(Continued)

FOREIGN PATENT DOCUMENTS

| | | |
|---|---|---|
| CN | 106294798 B | 1/2020 |
| CN | 112130733 A | 12/2020 |
| WO | WO-2020101479 A1 * | 5/2020 |

OTHER PUBLICATIONS

Asai et al., "Legible Thumbnail: Summarizing On-line Handwritten Documents based on Emphasized Expressions," ACM, MobileHCI 2011, Aug. 30-Sep. 2, 2011, https://dl.acm.org/doi/10.1145/2037373.2037459, pp. 551-556.

(Continued)

*Primary Examiner* — Asher D Kells
(74) *Attorney, Agent, or Firm* — Lily Neff

(57) ABSTRACT

A method, computer system, and a computer program product is provided for generating a detailed thumbnail and/or preview of a content. In one embodiment the technique comprises analyzing data obtained from a content and classifying it according to a plurality of specific types. A plurality of key information may be then extracted from the data according to the classification. A plurality of key-values are correlated to the plurality of key information so as to provide a plurality of key-value pairs. These pairs are consolidated accordingly to generate a thumbnail and/or a preview that at least renders the key information provided by the consolidated key-value pairs as a rendering.

20 Claims, 4 Drawing Sheets

(56) References Cited

U.S. PATENT DOCUMENTS

| | | | | |
|---|---|---|---|---|
| 2004/0205628 | A1* | 10/2004 | Rosenholtz | G06F 16/957 707/E17.119 |
| 2005/0010860 | A1* | 1/2005 | Weiss | G06F 16/9577 715/205 |
| 2011/0173188 | A1* | 7/2011 | Walsh | G06F 16/9577 707/E17.014 |
| 2012/0084644 | A1* | 4/2012 | Robert | G06F 16/168 715/255 |
| 2012/0117468 | A1* | 5/2012 | Ragan | G06F 3/0482 715/273 |
| 2012/0215864 | A1* | 8/2012 | Fukuoka | G06Q 10/10 709/206 |
| 2013/0124955 | A1* | 5/2013 | Goel | G06F 16/168 715/209 |
| 2015/0248429 | A1* | 9/2015 | Pregueiro | G06F 16/9577 715/202 |
| 2017/0052943 | A1* | 2/2017 | Owens | G06F 40/143 |
| 2018/0234375 | A1* | 8/2018 | Gray | G06Q 10/107 |
| 2019/0147178 | A1* | 5/2019 | Baldwin | H04L 51/52 726/28 |

OTHER PUBLICATIONS

Author Unknown, "Document Classification in an Automated Data Extraction Solution," Docsumo, Sep. 29, 2021, https://docsumo.com/blog/auto-document-classification, 11 pages.

Cheng, "How to extract Key-Value pairs from Documents using deep learning," Nanonets, Accessed: May 20, 2022, https://nanonets.com/blog/key-value-pair-extraction-from-documents-using-ocr-and-deep-learning/, 23 pages.

Erol et al., "Multimedia Thumbnails for Documents" ACM, MM'06, Oct. 23-27, 2006, https://dl.acm.org/doi/ abs/10.1145/1180639.1180701, pp. 231-240.

Suh et al., "Popout Prism: Adding Perceptual Principles to Overview+Detail Document Interfaces," ACM, CHI 2002, Apr. 20-25, 2002, vol. No. 4, Issue No. 1, https://dl.acm.org/doi/abs/10.1145/503376.503422, pp. 251-258.

\* cited by examiner

*UNIVERSITY OF ADE* 410          Offer of Admission

Date: 04-Feb-2021

Student Number: 12345678

Name: Steven Lee

Date of Birth: 01-Jan-2001

Dear Steven,

As the _____ Pathway Provider of the University of Ade _____ I am pleased to offer you admission to the following programs at the University of Ade _____ College and the University of Ade Details of the program of study and any specific conditions are outlined below. Please note, the start date of the first program is inclusive of orientation – attendance is compulsory.

Pathway Program:

| | | | |
|---|---|---|---|
| Program of Study: | Foundation Studies | Duration: | 2 (semesters) |
| CRICOS Course Code: | 041530A | CRICOS Provider Code: | 00123M |
| Location: | The University of Adelaide College located at 132 Grenfell Street, Adelaide, SA 5000 | | |

| Key 420 | Value 430 |
|---|---|
| Date | 04-Feb-2021 |
| Student Number | 12345678 |
| Name | Steven Lee |
| Date of Birth | 01-Jan-2001 |

FIG. 4

TECHNIQUES FOR THUMBNAIL AND PREVIEW GENERATION BASED ON DOCUMENT CONTENT

BACKGROUND

The present invention relates generally to the field of database management and more particularly to techniques for thumbnail and preview generation based on document content.

A thumbnail may be a compressed preview image of a document and it may be used as a placeholder to reflect something about its content. Typically, thumbnails may reflect an image with a small size of the first page of the document. Closely related to thumbnails are previews that also reflect a reduced image. In some cases, file explorer or document viewers may provide the preview. In these scenarios, a preview may also provide an image with a reduced size rendering of a part of a content. Thumbnails and previews may not be of documents but rather be images of video or image files.

Previews and thumbnails may be used in document recognition and organization efforts. In this capacity, they may be serving the same role for images as a normal text index does for words. Another advantage of using thumbnails and previews, as separate, smaller copies of the original image, may be to reduce bandwidth and improve download time. However, some designers use client-side scripting that make the user's browser shrink the picture, rather than use a smaller copy of the image. This results in no saved bandwidth, and the visual quality of browser resizing may be usually less than ideal.

In most cases, displaying a significant part of the picture instead of the full frame can allow the use of a smaller thumbnail while maintaining recognizability. A thumbnail makes for smaller, more easily viewable pages and also allows viewers to have control over exactly what they want to see. Thumbnail and preview features may be found on many file management systems.

SUMMARY

Embodiments of the present invention disclose a method, computer system, and a computer program product for generating a detailed thumbnail and/or preview of a content. In one embodiment, the technique comprises analyzing data obtained from a content and classifying it according to a plurality of specific types. A plurality of key information may then be extracted from the data according to the classification. A plurality of value may be then correlated to the plurality of key information so as to provide a plurality of key-value pairs. These key-value pairs may be consolidated accordingly to generate a thumbnail and/or a preview that renders at least the information provided by the consolidated key-value pairs.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings:

FIG. 4 provides an example of key-value pairs being generated from a sample document according to one embodiment.

DETAILED DESCRIPTION

Figure 1:
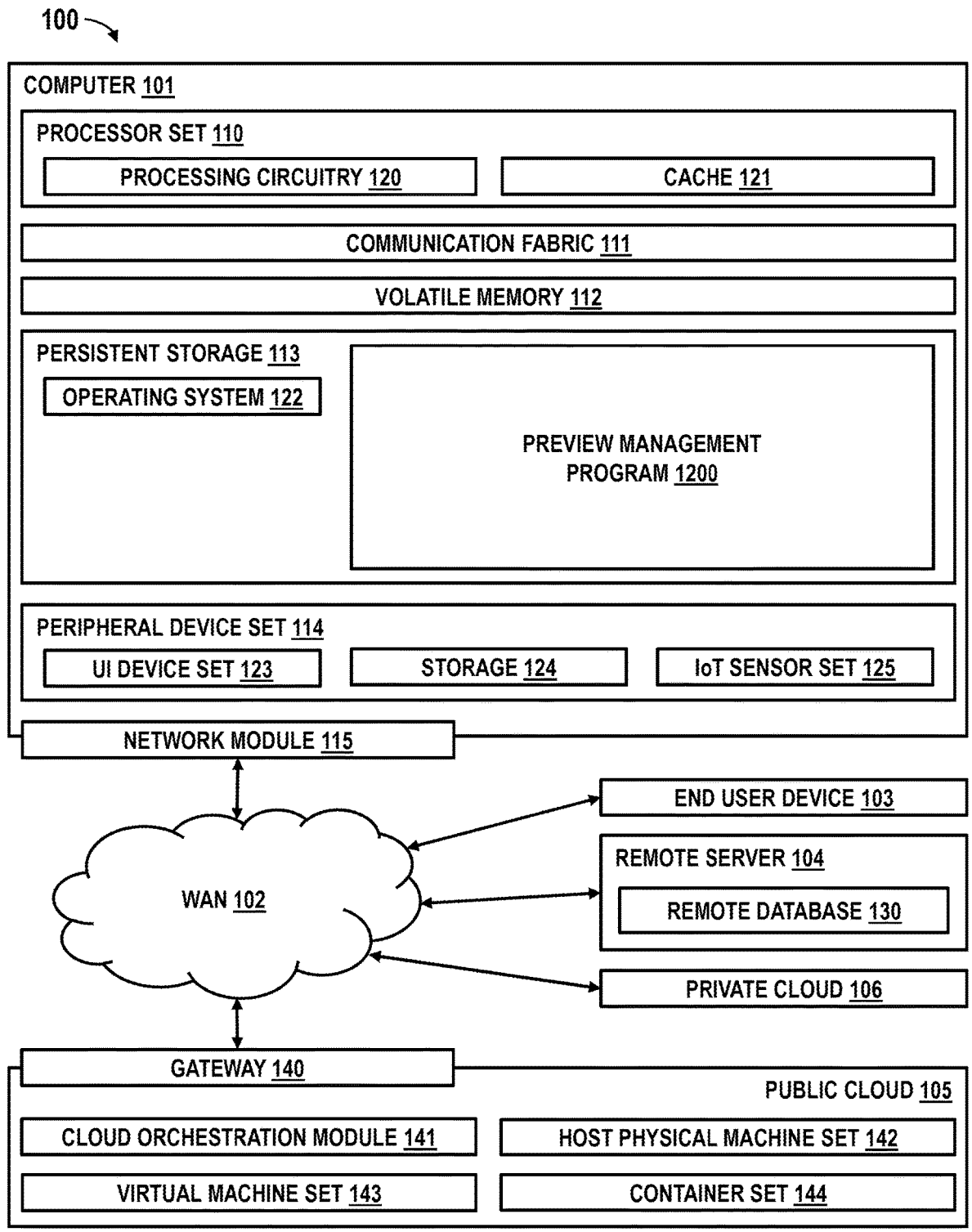
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a thumbnail and preview management program (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
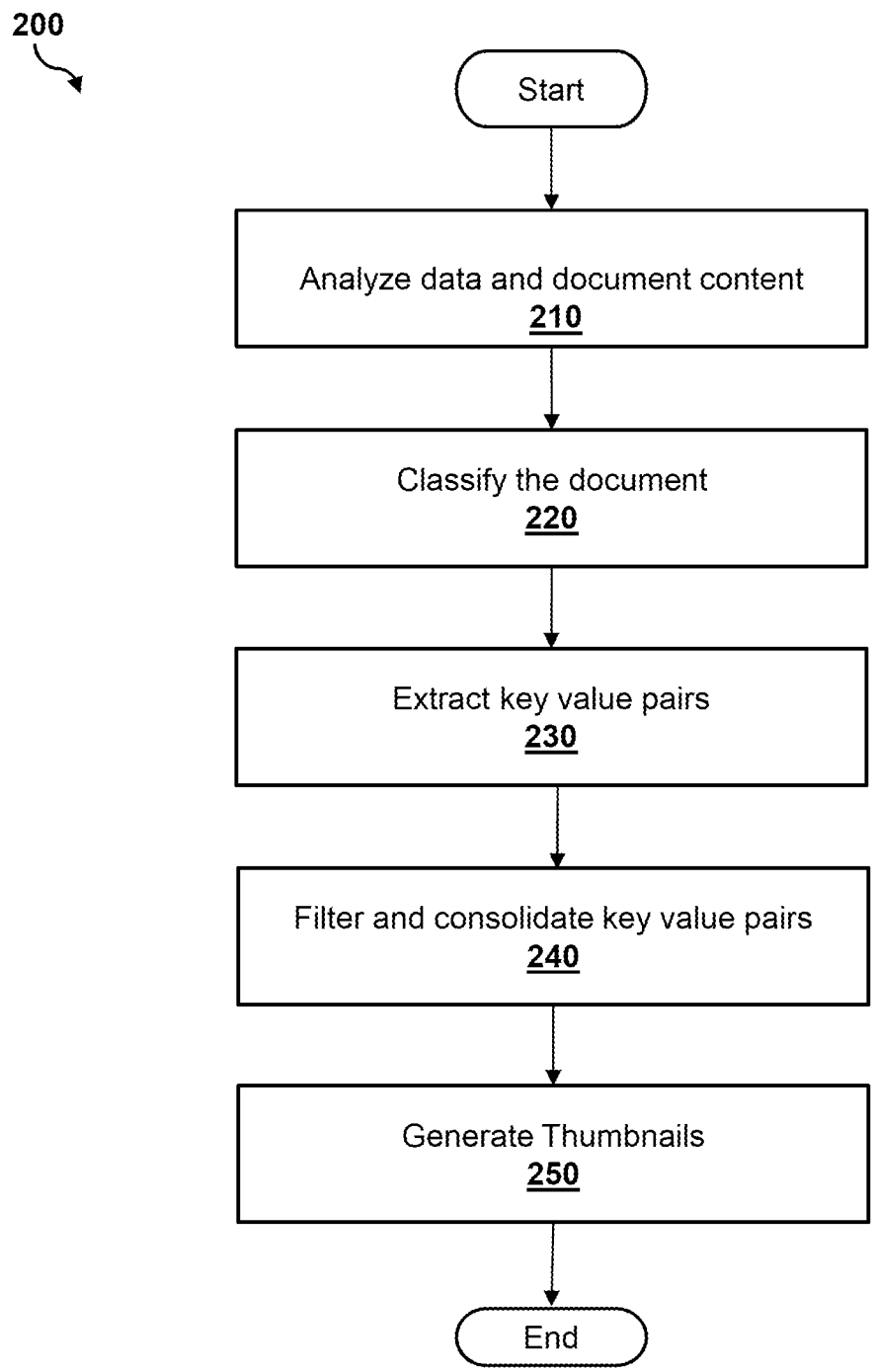
FIG. 2 provides an operational flowchart for generating a detailed thumbnail/preview rendering according to one embodiment.

FIG. 2 provides a flowchart depiction of a process 200 that can provide the generation of detailed thumbnail and preview renderings according to one embodiment. As discussed earlier, thumbnails or preview images allow users to be presented with an overview of different content in a small space. A thumbnail may be a compressed preview image of the document content that may be used as a placeholder. Typically, a thumbnail may be an image with a small size. Some file explorers or document viewers may also provide a preview of the document. A preview image may also be a reduced version of the original content. Thumbnail and preview features can be found on many file management systems.

The problem, however, occurs in many instances when viewing business documents. In such scenarios, thumbnails and preview images may be too small to show the important content to users. It may be hard for these users to decide whether the document may contain the desired information through thumbnails or previews. Users must open the document to read the content which causes much inconvenience and other issues.

The process 200 provides for techniques to generate a thumbnail and/or preview that provide important information as part of the rendering (based on information provided by the content) presented to the user. The content may be comprised of documents, videos, images or live streams or prerecorded streams amongst other things.

In Step 210, the content and layout of a received content may be analyzed. The word document may be used interchangeably with content with the understanding that both provide for a variety of presented contents. This includes text, images, video and audio files or any type of obtained data file that is received as actual text documents, electronic or faxed documents, or one obtained from a database or during a live stream or podcast. This can take a variety of alternate forms as can be appreciated by those skilled in the art.

In Step 210, once the document/content is obtained (received or obtained from a database or through user input or even automatically from a third party or an artificial intelligence—AI agent), the document may be analyzed for certain types of information. In one embodiment several techniques can be used to perform the analysis such as through an optical character recognition.

In Step 220, the analysis provides for classification of certain information based on what is provided by the data in the content/document. In one embodiment, this classification can be to a specific type of information. For example, in one scenario, the type of classified information can be whether the content is an invoice document, an offer letter, a manufacturer recall, etc. Other potential examples may be a document type such as a form of identification—a state identification (ID) card, a driver license, or an employment badge, among other things.

In Step 230, the information is retrieved from the classified content. The classification may be useful in the recognition of key information, Once the key information is retrieved, a value is associated with it to form a Key-Value pair.

To understand this concept better, FIG. 4 provides an example. As seen in the scenario of FIG. 4, an admission letter 410 may be sent to a student by a university. The admission letter includes a variety of information including student's name and student number and other information. In the table generated below, the Key 420 and Values 430 may be provided as pairs. This information may be extracted from the admission offer and provided as the key-value pairs (data from content) provided in the table. For example, the "Student Number" may be a Key (420) and the Value (430) may be "12345678" in this case.

In Step 240, the key value pairs (KVPs) may be filtered and consolidated according to one or more instructions or policies that may be selected by a user or automatically. In one embodiment, these can be filtered and consolidated according to user preferences.

In Step 250, a thumbnail or a preview may be generated for the document with the key value pairs (KVP). However, it should be noted that these thumbnails and previews provide a clear and detailed view of the document and the information such as KVPs can be provided in the thumbnail and the preview.

In one embodiment, when multiple pages exist in the document and as content, one of the pages can be selected as a default page to generate the thumbnail and/or the preview image. In one embodiment, the page may be the one that contains the most important/preferred KVPs or the greatest number of KVPs based on user configuration. In one embodiment, all KVPs extracted from different pages may be consolidated and displayed on this thumbnail/preview image of the default page (overlap/extended/flipped layer), so that user does not need to navigate to different pages to see these KVPs.

In one embodiment, the KVP can be stored such as in a database for use (either current or future). In one embodiment such as the one used in conjunction with FIGS. 2 and 4, the KVP can have the following format:

The key-value pair data may be stored like:

[{
a. "Key": "Date",
b. "Value": "04-Feb.-2021",
c. "Key_X": 1782,
d. "Key_Y": 222,
e. "Key_Width": 216,
f. "Key_Height": 30,
g. "Value_X": 2037,
h. "Value_Y": 222,
i. "Value_Width": 159,
j. "Value_Height": 30,
k. "Confidence": "High",
l. "PageNumber": 1
}, {
a. "Key": "Student Number",
b. "Value": "12345678",
c. "Key_X": 1108,
d. "Key_Y": 463,
e. "Key_Width": 126,
f. "Key_Height": 30,
g. "Value_X": 1251,
h. "Value_Y": 463,
i. "Value_Width": 256,
j. "Value_Height": 30,
k. "Confidence": "High",
l. "PageNumber": 4
}, . . .]

Figure 3:
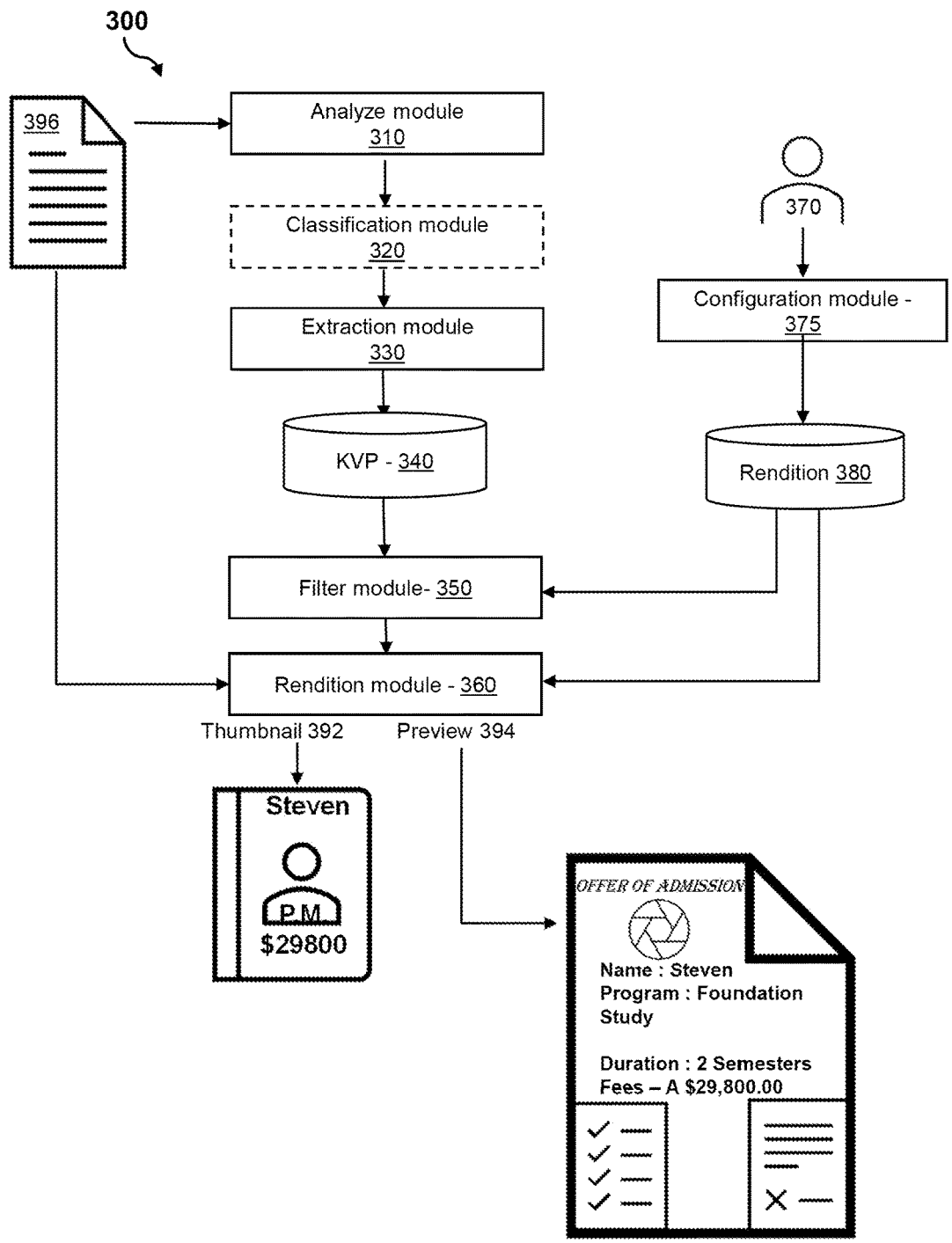
FIG. 3 provides an operational flowchart for generating a detailed thumbnail/preview rendering according to an alternate embodiment.

FIG. 3 provides another flowchart depiction of an alternate embodiment. Similar as to process 200 of FIG. 2, the process 300 in FIG. 3 provides for techniques to generate detailed renderings of a thumbnail or preview providing key information arising from the content.

Information and requests can be obtained or provided (such as through a retrieved or scanned document, a video or live stream etc.) as shown at 396. The process moves similar to FIG. 2, by the analysis module 310 then providing the analysis and the classification and extraction module processing the document at 320 and 330 respectively. However, user information can be also accepted as shown at 370.

This user information (and other documents and materials) will be processed and accepted by a configuration module (i.e., model) 375.

In one embodiment, the configuration module 375 accepts user input to set the keys that user may be interested and notifies a rendition module 380. The rendition module updates the thumbnail 392 and the preview images 394.

A Filter module 350 may also be used to accept a user configuration and access KVP data. 340 to filter and feed proper KVP data to a Rendition Module 360. In one embodiment, this module filters the KVP data selectively. For example, in one scenario, the KVP data may be filtered by user input, mutuality of the data and document type, frequency, etc.

The Rendition module 360, then generates a separate thumbnail 392 and preview images 394 based on the actual document content and the key value data pairs. While it may not be veer apparent in the illustration of FIG. 3, the thumbnail and the preview information have sufficient and clear view of the actual material (document, video etc.) and a summary provided in the picture that makes selection even simpler. In one embodiment, the key-value pairs data may be displayed as an overlap/extended/flipped layer upon the document content.

It should be noted that a variety of documents can be processed in this way. This may be indicated in FIG. 3 by the arrow returning from 392/394 point back to 310 (the document 396 can embody a sting of documents that may be processed one at a time). In this manner, the process facilitates a desire to summarize, index and obtain important information from a bunch of content (documents etc.) in an efficient manner without needing to open and check them one by one.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a detailed thumbnail of a content so that multiple thumbnails can be presented simultaneously on a display to a user, comprising;
   analyzing data obtained from a content; wherein the content includes at least at least one of an audio file, a video file, a document, or one or more images;
   classifying a part of said data from said content according to a plurality of specific types to provide a plurality of keys;
   retrieving information from said data that has been classified as a key to provide an associated value that can be used to generate a plurality of key value pairs using information from said classified data wherein said plurality of key value pair related information includes instruction selected by a user relating to consolidation of a plurality of key-value pairs and about said keys or value type;
   corelating a plurality of values to said plurality of key information extracted so as to provide a plurality of key-value pairs;
   consolidating said plurality of key-value pairs to reflect at least one user interested information accordingly;
   generating a thumbnail of said content; wherein said thumbnail provides information in a compressed area; said thumbnails configured to be selectively flipped on said display to provide alternate information to said user; and
   said thumbnail providing a view of said consolidated key-value pairs including said user interested information.

2. The method of claim 1, wherein said content is a document having both text and image.

3. The method of claim 2, wherein key-value pair data is displayed on said thumbnail as an overlap, extended and or flipped layer upon said document content.

4. The method of claim 1, further comprising:
   receiving user input and configuring said user input to update said thumbnails.

5. The method of claim 4, wherein a filter module accepts user input as configuration and access data relating to said key-value pair.

6. The method of claim 4, wherein a rendition of a thumbnail and/or preview is provided using said user input and said a plurality of key-value pairs.

7. The method of claim 6, wherein said plurality of key-value pairs are filtered by one of user input data, mutuality of the data, content type and/or data frequency.

8. The method of claim 1, wherein a default page is selected to generate a thumbnail and/or preview rendering when multiple pages exist and wherein a rendering page is selected based on either a most preferred key-value pair (KVP) or one with a largest number of KVPs and wherein any KVPs from different pages will be consolidated and displayed on said thumbnail and/or preview rendering page.

9. The method of claim 1, wherein said plurality of key-value pairs are stored in a database.

10. The method of claim 1, wherein said content is an audio file, a video file or a streaming content.

11. The method of claim 1, wherein said plurality of key-value pairs are consolidated and arranged according to a user preference.

12. A computer system for providing a detailed thumbnail of a content, so that multiple thumbnails can be presented simultaneously on a display to a user, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform the steps:
   analyzing data obtained from a content; wherein the content includes at least at least one of an audio file, a video file, a document, or one or more images;
   classifying a part of said data from said content according to a plurality of specific types to provide a plurality of keys;
   retrieving information from said data that has been classified as a key to provide an associated value that can be used to generate a plurality of key value pairs using information from said classified data wherein said plurality of key value pair related information includes instruction selected by a user relating to consolidation of a plurality of key-value pairs and about said keys or value type;

corelating a plurality of values to said plurality of key information extracted so as to provide a plurality of key-value pairs;

consolidating said plurality of key-value pairs to reflect at least one user interested information accordingly;

generating a thumbnail of said content; wherein said thumbnail provides information in a compressed area; said thumbnails configured to be selectively flipped on said display to provide alternate information to said user; and said thumbnail providing a view of said consolidated key-value pairs including said user interested information.

13. The computer system of claim 12, further comprising:
receive user input and configuring said user input to update said thumbnails.

14. The computer system of claim 13, wherein said user indicates whether user is interested in the thumbnail to be updated responsive to user provided input.

15. The computer system of claim 14, wherein a filter module accepts user input as configuration and access data relating to a plurality of key-value pair data.

16. The computer system of claim 12, wherein said content is a document having both text and image.

17. The computer system of claim 16, wherein key-value pair data is displayed on said thumbnail as an overlap, extended and or flipped layer upon said document content.

18. A computer program product, comprising:
one or more computer-readable storage medium and program instructions stored on at least one of the one or more tangible storage medium, the program instructions executable by a processor, the program instructions comprising:

analyzing data obtained from a content; wherein the content includes at least at least one of an audio file, a video file, a document, or one or more images;

classifying a part of said data from said content according to a plurality of specific types to provide a plurality of keys;

retrieving information from said data that has been classified as a key to provide an associated value that can be used to generate a plurality of key value pairs using information from said classified data wherein said plurality of key value pair related information includes instruction selected by a user relating to consolidation of a plurality of key-value pairs and about said keys or value type;

corelating a plurality of values to said plurality of key information extracted so as to provide a plurality of key-value pairs;

consolidating said plurality of key-value pairs to reflect at least one user interested information accordingly;

generating a thumbnail of said content; wherein said thumbnail provides information in a compressed area; said thumbnails configured to be selectively flipped on said display to provide alternate information to said user; and said thumbnail providing a view of said consolidated key-value pairs including said user interested information.

19. The computer program product of claim 18, wherein said content is a document having both text and image.

20. The computer program product of claim 18, further comprising:
receiving user input and configuring said user input to update any thumbnails.

* * * * *